Jan. 17, 1967 A. VASSALLO 3,298,254
GROOVING TOOL HOLDER
Filed Jan. 7, 1965
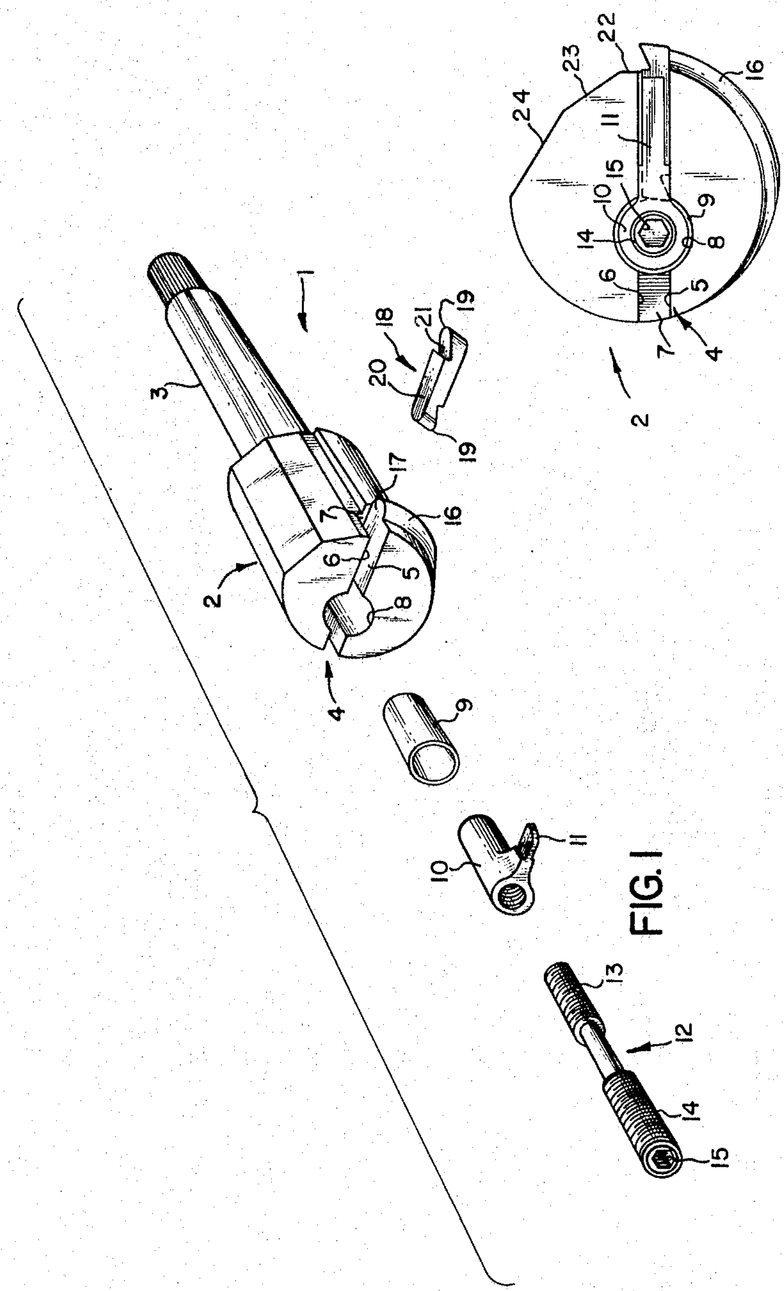
INVENTOR.
ANGELO VASSALO
BY
Learman, Learman & McCulloch
ATTORNEYS

United States Patent Office 3,298,254
Patented Jan. 17, 1967

3,298,254
GROOVING TOOL HOLDER

Angelo Vassallo, Silverwood, Mich. 48760

Filed Jan. 7, 1965, Ser. No. 423,964
4 Claims. (Cl. 77—58)

This invention relates to tool holders, and more particularly to a holder for removably supporting a cutting tool adapted for use with internal recessing or grooving machines for cutting annular grooves in cylindrical workpieces.

An object of this invention is to provide a holder for an annular grooving tool in which the cutting tool may be removably supported in such manner as to facilitate the substitution of a fresh cutting tool when conditions so require.

Another object of the invention is to provide a tool holder of the character referred to and adapted for the accommodation of an end-for-end reversible tool bit.

A further object of the invention is to provide easily and quickly operable clamping means for releasably clamping a cutting tool in the tool holder.

Another object of the invention is to provide a grooving tool holder provided with means for supporting a cutting tool with such stability as to avoid chatter and vibration during cutting operations, thereby prolonging the life of the cutting tool and enabling the grooving of workpieces to extremely close tolerance.

Other objects and advantages of the invention will be pointed out specifically or will become apparent from the following description when it is considered in conjunction with the appended claims and the accompanying drawings, in which:

FIGURE 1 is an exploded, perspective view of apparatus constructed in accordance with the invention; and FIGURE 2 is an end elevational view of the assembled apparatus.

Apparatus constructed in accordance with the invention comprises a holder 1 having a generally cylindrical body 2 from one end of which extends a cylindrical shank 3 of reduced cross-section adapted to be mounted in a chuck or the like (not shown) of a milling, boring or other machine. At its other end, the body 2 is provided with a transverse, substantially diametral slot 4 having spaced apart, opposed side walls 5 and 6, and a base wall 7. The slotted end of the body 2 also is provided with an axially extending bore 8 in communication with the slot 4 and being provided at its inner end in screw threads (not shown).

A cylindrical sleeve 9 having smooth inner and outer surfaces is adapted to be received in the bore 8 for a purpose presently to be explained. An elongated, annular clamp member 10 is adapted to be slideably received within the sleeve 9, the member 10 having a smooth outer surface and a threaded inner bore. Projecting laterally from one end of the member 10 is a clamp arm 11 which is spaced a substantial distance from the opposite end of the member 10. A clamp screw 12 has a threaded end 13 that is adapted to pass through the clamp member 10 and be threadably engaged with the threaded end of the bore 8. The screw 12 has a second threaded end 14 that is adapted to engage the threads in the clamp member 10. The screw 12 is provided with a socket 15 for reception of a suitable tool for effecting rotation of the screw.

Between the ends of the body 2 is a radially outwardly projecting, circumferentially extending rib 16 terminating at the slot 4 in a radially extending, flat supporting surface 17 that is flush with and extends in prolongation of the side wall 5 of the slot. The surface 17 is normal to the base wall 7 of the slot but projects radially beyond the latter. The rib 16 is of less width than the depth of the slot and diminishes radially in a direction circumferentially away from the surface 17 to merge smoothly into the body 2 as is best shown in FIGURE 2.

The tool holder is adapted removably to receive an elongated cutting tool bit 18 terminating at its opposite ends in two identical cutting tips 19 formed on opposite sides of the body. Each cutting tip 19 has a profile, in plan, corresponding to the profile of the supporting surface 17 and is of such width from side to side as to correspond to the width of the rib, whereby either cutting end 19 may overlie and be fully supported throughout its length by the side wall 5 and the supporting surface 17. The upper and lower surfaces of the tool bit 18 are flat for a majority of their length as is indicated at 20, but adjacent each end of the bit is a notch 21 to provide chip clearance between the cutting tip and the workpiece.

Preferably, the tool body is cut away along its length to provide plane surfaces 22, 23 and 24 so as to assure ample clearance between the cutting tool and the part to be grooved.

In the operation of the apparatus, a cutting tool 18 is inserted in the slot 4 and so arranged that the cutting edge 19 forms substantially a continuation of the rib 16. Preferably, the cutting tool 18 is of such length that its inner end may abut the sleeve 9 and position the outer end of the tool bit properly with respect to the rib 16, thereby facilitating assembly of the tool bit with the holder. When the tool bit is in place, the clamp screw 12 may be rotated so as to cause the bit 18 to be clamped tightly between the arm 11 and the base wall 7.

In use, the outer cutting end 19 of the tool bit engages the workpiece to be grooved and in such manner that the thrust exerted by the workpiece against the tool bit is tangential to the periphery of the rib 16. Thus, the rib 16 provides a firm and stable support for the tool bit, thereby avoiding the risk of chatter.

When one cutting end of the bit 18 becomes dull, it may be turned end for end so as to present the other cutting surface to the workpiece. When both ends of the tool bit have been dulled, the bit may be replaced by another.

The disclosed embodiment is representative of a presently preferred form of the invention, but is intended to be illustrative rather than definitive thereof. The invention is defined in the claims.

I claim:

1. A grooving tool comprising a generally cylindrical body having an axially extending bore and a transversely extending slot intersecting said bore at one end of said body; said slot having opposed side walls terminating in a base wall; a rib projecting radially outwardly from the periphery of said body and having a radial tool supporting surface normal to said base wall and extending in prolongation of one of said side walls, said rib having an axial width less than the depth of said slot; a cutting tool having a width dimension corresponding to the width of said rib and overlying the supporting surface of said rib; a sleeve member received in said bore and in engagement with the radially inner end of said tool; a clamp member received in said bore and having a tool engaging arm overlying and engaging said tool; and means for securing said clamp member to said body with said tool clamped between said base wall and said arm.

2. The construction set forth in claim 1 wherein said tool has cutting surfaces at both of its ends.

3. The construction set forth in claim 1 wherein said rib extends circumferentially about a portion of said body, said rib diminishing radially in a direction circumferentially away from said tool supporting surface.

4. A grooving tool comprising a generally cylindrical body having a transverse slot at one end thereof terminating in a base wall axially inward from said one end, said body having an axial bore therein intersecting said groove;

a rib projecting radially outwardly from the periphery of said body and extending circumferentially about a portion of said body; said rib having a radialy tool supporting surface adjacent and normal to said base wall and terminating flush with one side wall of said slot; a cutting tool received in said slot, said cutting tool having an axial width no greater than the axial depth of said slot and corresponding substantially to the axial width of said rib, said cutting tool overlying and being supported on the supporting surface of said rib; means received in said bore and projecting into said slot to provide a seat for the radially inner end of said cutting tool; and means for clamping said cutting tool in said slot.

References Cited by the Examiner

UNITED STATES PATENTS

| | | | |
|---|---|---|---|
| 1,668,351 | 5/1928 | Black | 77—58 |
| 2,062,607 | 12/1936 | Reaney | 29—96 |

FOREIGN PATENTS

| | | |
|---|---|---|
| 117,394 | 8/1943 | Australia. |

WILLIAM W. DYER, Jr., *Primary Examiner.*

G. A. DOST, *Assistant Examiner.*